June 11, 1935. M. E. McSWAIN 2,004,899
MINNOW TRAP
Filed Jan. 18, 1934
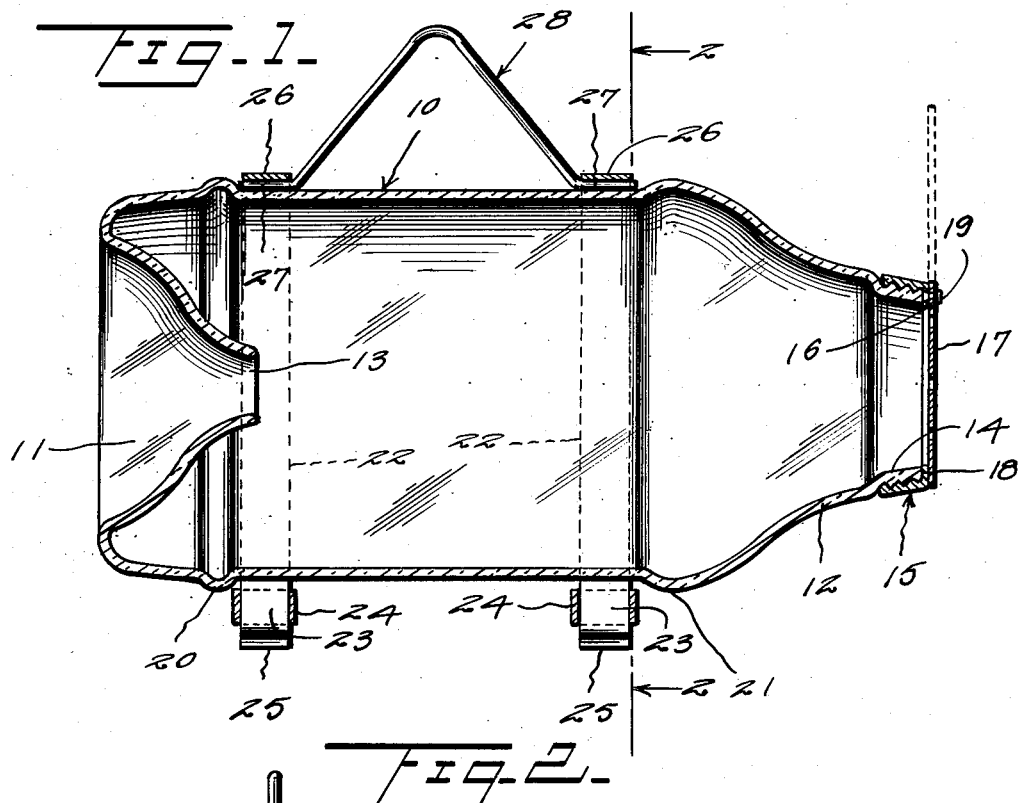
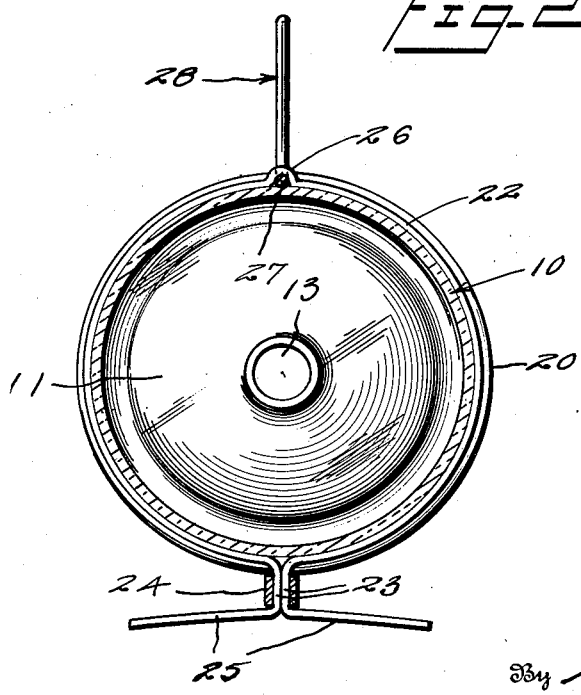
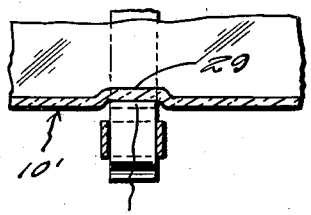
Inventor
M. E. McSwain
By Watson E. Coleman
Attorney Patented June 11, 1935

2,004,899

UNITED STATES PATENT OFFICE 2,004,899

MINNOW TRAP

Melvin E. McSwain, Memphis, Tenn.

Application January 18, 1934, Serial No. 707,188

4 Claims. (Cl. 43—65)

This invention relates to minnow traps and has for an important object thereof the provision of a transparent minnow trap which is so constructed that it can be readily raised or lowered into the water without injury to the trap.

Another object of this invention is to provide a trap of this kind which is exceedingly simple in construction, the body of which is made out of transparent material such as glass or the like which is suitably protected against breakage.

Another object of this invention is to provide in a transparent trap structure of this kind means whereby a handle or bail may be secured to the side of the trap and also means secured to the body of the trap for holding the trap in horizontal position when in the water.

The above and various other objects and advantages of this invention will in part be described in and in part be understood from the following detailed description of the present preferred embodiment, the same being illustrated in the accompanying drawing, wherein:—

Figure 1 is a longitudinal section taken substantially through the longitudinal center of a device constructed according to the preferred embodiment of this invention;

Figure 2 is a transverse section taken on the line 2—2 of Figure 1; and

Figure 3 is a fragmentary longitudinal section of a modified form of this invention.

Referring to the drawing wherein like numerals of reference designate corresponding parts throughout the several views, the numeral 10 designates generally the body of a trap constructed according to the preferred embodiment of this invention, which body is substantially cylindrical in construction and is provided at one end with a substantially truncated cone 11 which is disposed with the apex extending inwardly of the adjacent end of the body 10. This truncated cone 11 has an opening 13 therein which constitutes the entrance to the interior of the trap so that minnows or the like may freely enter from this end of the trap.

The opposite end of the trap is provided with a reduced portion 12 terminating in a threaded end portion 14 with which a cap 15 is threadably engaged. The cap 15 has the central portion thereof cut out so as to provide an opening 16 and a perforated plate 17 is secured to the flanged or inwardly extending portion 18 of the cap 15 by means of a rivet or pivot 19.

The body 10 in the present instance is preferably constructed of glass or other transparent material and the cap 15 may be constructed out of metal. By providing the plate or closure 17 on the cap 15 the minnows on the inside of the trap 10 may be readily removed therefrom without unthreading the cap 15 as the plate 17 can be swung on the pivot 19 so as to uncover the opening 16.

The body 10 shown in Figure 1 is provided with a pair of annular ribs or raised portions 20 and 21. A pair of flat bands 22 are disposed about the body 10 between the beads or raised portions 20 and 21, one band 22 being disposed adjacent the rib or bead 21. The bands 22 are each constructed from a single strip of material which is wrapped about the body 10 and the free ends of the strip are brought together on the under or lower side of the body, as at 23, and these straight portions of the band 22 are clamped or secured together by means of a clamp or strap 24. The ends of the band 22 are continued beyond the clamp or securing member 24, each end being extended outwardly so as to provide a pair of base portions 25 extending in opposite directions. Each band 22 has on the upper side thereof an eye or loop 26 within which an end 27 of a handle or bail 28 is loosely disposed, the bail 28 being positioned between the spaced bands 22.

In Figure 3 there is disclosed a modified form of minnow trap wherein the body 10' is substantially cylindrical in construction and is provided at spaced points with a pair of annular grooves or countersunk portions 29. These countersunk portions or annular grooves 29 are adapted to receive the bands 22' and in the construction shown in Figure 3 the bands 22' are substantially flush with the periphery of the body 10. The annular grooves 29 hold the bands 22' against movement longitudinally of the body 10'. The remainder of the trap structure shown in Figure 1 is used in connection with the modified form of trap structure shown in Figure 3.

In the use of the minnow trap structure herein disclosed, the base portions 25 of the bands 22 constitute the feet or supporting means and the extensions 23 operate to raise the body 10 of the trap off the ground so that the entire trap will be supported in upwardly spaced relation to the surface engaged by the base or foot members 25.

When the trap is in use the plate 17 will be in closed position over the rear end of the trap and engaged with the flange 18 of the cap 25. In the present instance the bail 28 is constructed substantially of V-shape so that a hook may be engaged with the convergent end of the bail and this convergent end substantially overlies the central portion of the trap so that the trap will be lowered into the water in a substantially horizontal position.

Through the use of the clamps 24 which engage the straps or bands 22, the bands 22 are held tightly about the trap 10 and these bands 22 also provide supporting means by extending the bands outwardly, as shown at 25, to support the trap in upraised position. The clamps 24 are constructed by using a relatively narrow band and wrapping this band about the straps 22 and then pressing the band tightly together so as to hold the end portions 23 of the strap 22 tightly together.

What is claimed is:—

1. A minnow trap as set forth comprising a substantially cylindrical body, a substantially truncated cone integral with one end of the body and disposed with the smaller end thereof inwardly of the body and provided with an entrance opening, a threaded reduced portion on the opposite end of the body, a cap engaging said threaded end, a pair of annular ribs integral with the body and disposed in spaced relation to each other, a pair of relatively narrow flat bands engaging about the body between said ribs, looped members for securing said bands about the body in spaced relation to each other, extensions carried by said bands and constituting base portions, a loop integral with each band and a bail engaging the loop of each band.

2. A trap as set forth comprising a substantially cylindrical body, a substantially truncated cone integral with one end of the body and disposed with the smaller end thereof inwardly of said one end and provided with an entrance opening, a reduced portion on the opposite end of the body, threads on said reduced portion, a cap engaging said threads, a pair of bands engaging the periphery of the body and disposed in spaced relation to each other thereabout, looped members for securing the bands about the body, extensions carried by each band and constituting base portions for holding the trap in substantially horizontal position and in spaced relation to a plane surface, a loop carried by each band, a bail engaging the loop of each band and means for holding the bands on the body against longitudinal movement relative to the body.

3. A trap as set forth comprising a substantially cylindrical body, a substantially truncated cone integral with one end of the body and extending inwardly thereof and provided with an entrance opening, a reduced portion on the opposite end of the body, a perforated cap carried by said reduced portion, a pair of relatively flat bands engaging about the periphery of the body and disposed in spaced relation to each other, a looped member for securing the bands about the body against circumferential movement, base members integral with the bands for holding the body against turning movement on a plane surface, an eye or loop integral with each band, a substantially V-shaped bail having outturned end portions engaged with the eyes of the bands and means integral with the body for holding the bands against endwise movement relative to the body.

4. A trap as set forth comprising a substantially cylindrical body, a substantially truncated cone integral with one end of the body and extending inwardly thereof and provided with an entrance opening, a reduced portion on the opposite end of the body, a cap engaging said reduced portion, said body having a pair of annular grooves in the periphery thereof disposed in spaced relation to each other, a pair of bands disposed one in each groove, a looped member about the bands for holding the bands against circumferential movement, means integral with each band for holding the body against turning movement, an eye integral with each band and a bail engaging the eyes of the bands.

MELVIN E. McSWAIN.